United States Patent
Zheng

(10) Patent No.: US 12,101,515 B2
(45) Date of Patent: Sep. 24, 2024

(54) LIVE STREAM SCREEN DISPLAY METHOD AND APPARATUS, STORAGE MEDIUM, AND ELECTRONIC DEVICE

(71) Applicant: Tencent Technology (Shenzhen) Company Limited, Shenzhen (CN)

(72) Inventor: Shuyuan Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 23 days.

(21) Appl. No.: 18/131,300

(22) Filed: Apr. 5, 2023

(65) Prior Publication Data

US 2023/0247233 A1 Aug. 3, 2023

Related U.S. Application Data

(63) Continuation of application No. PCT/CN2022/099722, filed on Jun. 20, 2022.

(30) Foreign Application Priority Data

Aug. 6, 2021 (CN) .......................... 202110904507.X

(51) Int. Cl.
*H04N 21/2187* (2011.01)
*H04N 21/258* (2011.01)
*H04N 21/442* (2011.01)

(52) U.S. Cl.
CPC ... *H04N 21/2187* (2013.01); *H04N 21/25825* (2013.01); *H04N 21/25866* (2013.01); *H04N 21/44204* (2013.01)

(58) Field of Classification Search
None
See application file for complete search history.

(56) References Cited

U.S. PATENT DOCUMENTS 11,409,370 B1 * 8/2022 Pavlou ................ H04M 3/567
2013/0304761 A1 11/2013 Redlich et al.
(Continued)

FOREIGN PATENT DOCUMENTS

CN 106210753 A 12/2016
CN 107948666 A 4/2018
(Continued)

OTHER PUBLICATIONS

Tencent Technology, ISR, PCT/CN2022/099722, Sep. 13, 2022, 3 pgs.

(Continued)

*Primary Examiner* — James R Marandi
(74) *Attorney, Agent, or Firm* — Morgan, Lewis & Bockius LLP

(57) ABSTRACT

The present invention discloses a live stream screen display method performed by an electronic device. The method includes: obtaining a running screen of a target application displayed in a display screen of a target mobile terminal used by a live streamer account, and pushing the running screen to a user device corresponding to a user account watching the live streamer account as a live stream screen; and when the running screen of the target application in the display screen is affected by a running screen of a first application that does not belong to at least one preset target application, stopping pushing the running screen of the target application to the user device and pushing a live stream prompt screen to the user device, the live stream prompt screen indicating that the live streamer account has currently paused the live stream.

20 Claims, 12 Drawing Sheets

(56) References Cited

U.S. PATENT DOCUMENTS

| | | |
|---|---|---|
| 2015/0156206 A1 | 6/2015 | Redlich et al. |
| 2017/0171638 A1 | 6/2017 | Liu |
| 2019/0058928 A1 | 2/2019 | Halper et al. |
| 2022/0365740 A1* | 11/2022 | Chang .................. G06F 3/0488 |

FOREIGN PATENT DOCUMENTS

| | | |
|---|---|---|
| CN | 111444540 A | 7/2020 |
| CN | 112148163 A | 12/2020 |
| CN | 112804551 A | 5/2021 |
| CN | 113058270 A | 7/2021 |

OTHER PUBLICATIONS

Tencent Technology, WO, PCT/CN2022/099722, Sep. 13, 2022, 4 pgs.
Tencent Technology, IPRP, PCT/CN2022/099722, Feb. 6, 2024, 5 pgs.

* cited by examiner

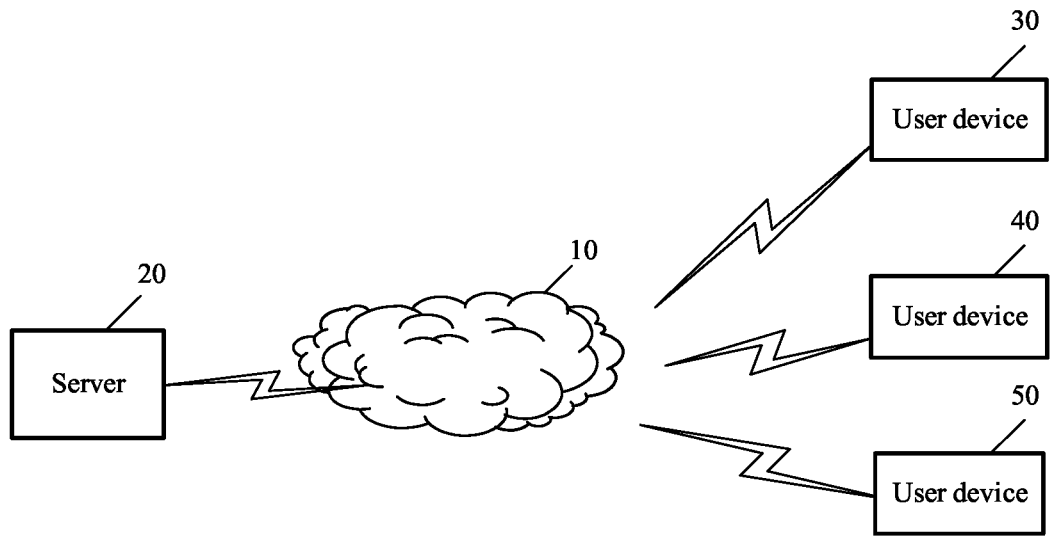

FIG. 1A

Obtain a running screen of a target application displayed in a display screen of a target mobile terminal used by a live streamer account, and push the running screen to a user device corresponding to a user account bound to the live streamer account as a live stream screen ⟵ S11

Stop pushing the screen displayed in the display screen of the target mobile terminal to the user device in a case that the running screen of the target application in the display screen is switched to a running screen of a first application that does not belong to at least one preset target application, and push a live stream prompt screen to the user device as a live stream screen ⟵ S12

FIG. 1B

LIVE STREAM SCREEN DISPLAY METHOD AND APPARATUS, STORAGE MEDIUM, AND ELECTRONIC DEVICE

CROSS-REFERENCE TO RELATED APPLICATIONS

This application is a continuation application of PCT Patent Application No. PCT/CN2022/099722, entitled "LIVE STREAM SCREEN DISPLAY METHOD AND APPARATUS, STORAGE MEDIUM, AND ELECTRONIC DEVICE" filed on Jun. 20, 2022, which claims priority to Chinese Patent Application No. 202110904507. X, entitled "LIVE STREAM SCREEN DISPLAY METHOD AND APPARATUS, STORAGE MEDIUM, AND ELECTRONIC DEVICE", filed with the China National Intellectual Property Administration on Aug. 6, 2021, all of which are incorporated herein by reference in their entirety.

FIELD OF THE TECHNOLOGY

The present invention relates to the field of computers, and specifically, to a live stream screen display method and apparatus, a storage medium, and an electronic device.

BACKGROUND OF THE DISCLOSURE

In recent years, due to convenience of using mobile terminals for live streaming, the live stream industry has developed more rapidly. However, during a live stream, a live streamer performs screen recording on a client of a live streamer side and shares a recorded screen, which easily causes leakage of private information of the live streamer due to unlimited screen recording during the live stream.

In this regard, in the related art, the live streamer often takes initiative to set whether to temporarily disable the screen on a management side to prevent a user from viewing to protect information privacy. However, this initiative increases operation costs, and depends on an active operation of the live streamer, which easily exposes private information of the live streamer before an operation.

SUMMARY

Embodiments of this application provide a live stream screen display method and apparatus, a storage medium, and an electronic device, to at least resolve the technical problem of poor controllability of privacy protection during live stream screen display.

An embodiment of this application provides a live stream screen display method performed by an electronic device, including:

obtaining a running screen of a target application displayed in a display screen of a target mobile terminal used by a live streamer account, and pushing the running screen to a playback client corresponding to a user account watching the live streamer account as a live stream screen; and when the running screen of the target application in the display screen is affected by a running screen of a first application that does not belong to at least one preset target application, stopping pushing a current screen displayed in the display screen to the user device and pushing a live stream prompt screen to the user device, the live stream prompt screen indicating that the live streamer account has currently paused the live stream.

An embodiment of this application further provides a live stream screen display apparatus, including:

a first recording unit, configured to obtain a running screen of a target application displayed in a display screen of a target mobile terminal used by a live streamer account, and push the running screen to a playback client corresponding to a user account watching the live streamer account as a live stream screen; and a generation unit, configured to stop pushing a current screen displayed in the display screen to the user device and push a live stream prompt screen to the user device, the live stream prompt screen indicating that the live streamer account has currently paused the live stream when the running screen of the target application in the display screen is affected by a running screen of a first application that does not belong to at least one preset target application.

An embodiment of this application further provides a non-transitory computer-readable storage medium, storing a computer program that, when executed by a processor of an electronic device, causes the electronic device to perform the live stream screen display method according to the embodiments.

An embodiment of this application further provides an electronic device, including a memory, a processor, and a computer program stored on the memory that, when executed by the processor, causes the electronic device to perform the live stream screen display method according to the embodiments through the computer program.

In the embodiments of this application, during screen recording on a live stream screen currently to be shared by a live streamer account through a client of a live stream application to perform a live stream to a user account watching the live streamer account, in a case in which a running screen of a target application in a display screen is switched to be displayed as a running screen of a first application (unauthorized recording application) that does not belong to the target application (authorized recording application), the running screen of the first application is hidden, and a live stream prompt screen used for prompting that the live streamer account has currently paused the live stream is pushed to the user account watching the live streamer account, which achieves the technical purpose of automatically hiding the running screen of the unauthorized recording application during live stream screen display, thereby implementing the technical effect of improving controllability of privacy protection during live stream screen display to resolve the technical problem of poor controllability of privacy protection during live stream screen display.

BRIEF DESCRIPTION OF THE DRAWINGS

Accompanying drawings described herein are used for providing a further understanding of the present invention, and constitute a part of this application. Exemplary embodiments of the present invention and descriptions thereof are used for explaining the present invention, and do not constitute an inappropriate limitation on the present invention. In the accompanying drawings:

FIG. 1A is a schematic diagram of an application environment of a live stream screen display method according to an embodiment of this application.

FIG. 1B is a schematic flowchart of a live stream screen display method according to an embodiment of this application.

DESCRIPTION OF EMBODIMENTS

Figure 2A:
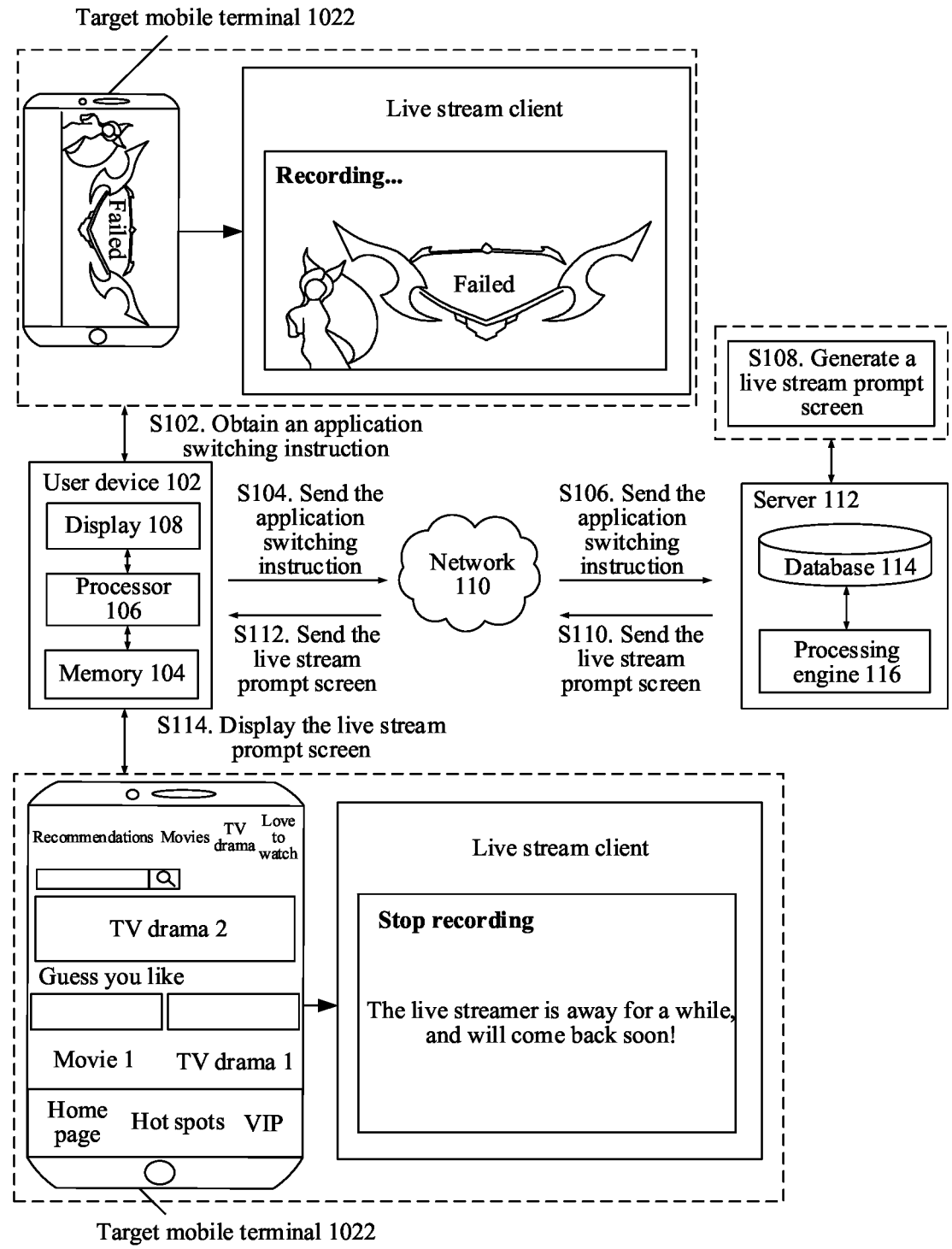
FIG. 2A is a schematic diagram of an application environment of a live stream screen display method according to an embodiment of this application.

To make a person skilled in the art better understand solutions of the present invention, the technical solutions in the embodiments of this application are clearly and completely described below with reference to the accompanying drawings in the embodiments of this application. Apparently, the described embodiments are merely some rather than all of the embodiments of the present invention. All other embodiments obtained by a person of ordinary skill in the art based on the embodiments of the present invention without creative efforts shall fall within the protection scope of the present invention.

The terms "first" and "second" in the specification and claims of the present invention and the foregoing accompanying drawings are used to distinguish similar objects, and are not necessarily used to describe a specific order or sequence. It is to be understood that data so used may be interchanged in an appropriate condition, so that the embodiments of the present invention described herein can be implemented in an order other than those illustrated or described herein. Moreover, the terms "comprise", "have", and any other variants thereof are intended to cover a non-exclusive inclusion. For example, a process, method, system, product, or device that includes a list of steps or units is not necessarily limited to those expressly listed steps or units, but may include other steps or units not expressly listed or inherent to such a process, method, product, or device.

FIG. 1A is a schematic diagram of an application environment of a live stream screen display method according to an embodiment of this application. As shown in FIG. 1A, a server 20 communicates with a plurality of user devices through a network 10. FIG. 1A only shows a user device 30, a user device 40, and a user device 50 as examples. In fact, there may be more user devices. The server 20 may be an independent device, or may be a plurality of devices, for example, a server cluster or a plurality of cooperative servers.

In some embodiments, the server 20 is configured to provide a user live stream service, that is, to push live stream screens provided by some user devices to some other user devices. For example, the user device 30 may provide a screen displayed in a display screen of the user device 30 or a screen displayed in a display screen of another terminal device in a communication connection with the user device 30 for the server 20, and the server 20 provides these screens for some other user devices, for example, the user device 40 and the user device 50 as live stream screens.

FIG. 1B is a schematic flowchart of a live stream screen display method according to an embodiment of this application. As shown in FIG. 1B, the method may include the following steps:

S11. Obtain a running screen of a target application displayed in a display screen of a target mobile terminal used by a live streamer account, and push the running screen to a user device corresponding to a user account watching the live streamer account as a live stream screen.

S12. Stop pushing the screen displayed in the display screen of the target mobile terminal to the user device corresponding to the user account watching the live streamer account when the running screen of the target application in the display screen is affected by (e.g., partially covered by or completely switched to) a running screen of a first application that does not belong to at least one preset target application, and push a live stream prompt screen to the user device corresponding to the user account watching the live streamer account as a live stream screen, the live stream prompt screen including pause prompt information used for prompting that the live streamer account has currently paused the live stream.

The method may be performed by an electronic device, for example, one of the server 20 or the user device in FIG. 1A.

When the method in each embodiment is performed by the server, some steps may be implemented by the user device, for example, the step of obtaining a screen may refer to obtaining a screen by the user device.

When the method in each embodiment is performed by the user device, some steps may be implemented by the server, for example, the step of pushing a live stream screen may refer to pushing a live stream screen by the server.

The live streamer account refers to an account registered in the server to provide a live stream screen. The user account watching the live streamer account refers to an account registered in the server to receive a live stream screen provided by the live streamer account. The user device corresponding to the user account watching the live streamer account may run a playback client configured to obtain the pushed live stream screen from the server, and display the live stream screen on the display screen of the user device.

The target mobile terminal is a terminal device used by the live streamer account and configured to generate an image used as a live stream screen. The image used as a live stream screen may be generated by the target application run in the target mobile terminal. The target application may be an application that can display a user interface thereof in the display screen of the target mobile terminal. The target application may be, for example, a camera application or a game application. In some embodiments, the live streamer account may pre-register at least one application that is allowed to perform a live stream in the server as the target application, to avoid privacy leakage caused by live streaming a running screen of an unregistered application to another user device.

In some embodiments, the user device and the target mobile terminal may be the same physical device, that is, the user device, namely, the target mobile terminal, provides the running screen of the target application displayed in the display screen to the server as a live stream screen.

In some other embodiments, the user device and the target mobile terminal may be different physical devices that are independent of each other and are in a communication connection. The target mobile terminal provides screens in the display screen of the target mobile terminal to the user device, and the user device provides these screens for the server as live stream screens. For example, the target mobile terminal may run a screen recording application with a screen recording function, and the screen recording application obtains running screens of the target application in the display screen of the target mobile terminal, and provides these running screens for the user device. The user device provides these running screens to the server as live stream screens. The user device and the target mobile terminal may communicate through a wireless communication connection, for example, WiFi, Bluetooth, or cellular mobile communication.

In some embodiments, the live streamer account may pre-register at least one application that is allowed to push a running screen thereof in the server as the target application, so that when the running screen displayed in the display screen of the target mobile terminal does not belong to the target application, pushing of the screen displayed in the display screen of the target mobile terminal to some other user devices is stopped. An application to which the screen displayed in the display screen of the target mobile terminal belongs is determined.

When the application is one of at least one preset target application, the step of obtaining a running screen of a target application displayed in a display screen of a target mobile terminal used by a live streamer account is performed.

In some other embodiments of the embodiments of this application, the live stream screen display method may be, but is not limited to, being applied to an environment shown in FIG. 2A. The environment may include, but is not limited to, a user device 102, a network 110, and a server 112. The user device 102 may include, but is not limited to, a display 108, a processor 106, and a memory 104.

As shown in FIG. 2A, the environment may further include a target mobile terminal 1022.

In some embodiments, the user device 102 and the target mobile terminal 1022 may be two independent devices. The user device 102 may run a live stream client, and the target mobile terminal 1022 may run a target application and a screen recording application used for providing a display image of the target mobile terminal 1022 for the live stream client in the user device 102. During a live stream, the target mobile terminal 1022 runs the target application and the screen recording application. The target application is run in a foreground of the target mobile terminal 1022, and a running screen of the target application is displayed in a display screen of the target mobile terminal 1022. The screen recording application provides the screen displayed in the display screen of the target mobile terminal 1022 for the live stream client run in the user device 102. The live stream client provides, through a corresponding server, for example, a live stream server with a client/server architecture, the received screen for the user device receiving the live stream. The user device 102 and an application run therein may communicate with the target mobile terminal 1022 and an application run therein through a wireless communication connection, for example, WiFi, Bluetooth, or cellular mobile communication.

In some embodiments, the user device 102 and the target mobile terminal 1022 may be the same device. A live stream process is similar to a live stream process when two devices are used.

In some embodiments, the screen recording application may be a functional module in the target application. In this case, the target application may provide the running screen for the live stream client through a screen recording module. In some other embodiments, the screen recording application may be a functional module in the live stream client. In this case, the live stream client may obtain the running screen of the target application through a screen recording module thereof.

As shown in FIG. 2A, the live stream screen display method according to some embodiments may include the following steps:

Step S102. The user device 102 obtains an application switching instruction triggered on the target mobile terminal 1022, where the application switching instruction is used for switching the application currently displayed in the foreground of the target mobile terminal 1022 to a first application.

Steps S104 to S106. The user device 102 sends the application switching instruction to the server 112 through the network 110.

Step S108. The server 112 searches for relevant historical data of the first application through a database 114 (determines whether the first application belongs to the target application, and it is assumed herein that the first application does not belong to the target application), and generates a live stream prompt screen through a processing engine 116, where the live stream prompt screen includes prompt information "The live streamer is away for a while, and will come back soon!".

Steps S110 to S112. The server 112 sends the live stream prompt screen to the user device 102 through the network 110.

Step S114. The processor 106 in the user device 102 displays the live stream prompt screen in the display 108, and stores relevant historical data that the first application does not belong to the target application in the memory 104.

In addition to the example shown in FIG. 2A, the foregoing steps may be independently completed by the user device 102, that is, the user device 102 performs steps such as searching for relevant historical data of the first application and generating the live stream prompt screen, thereby reducing processing pressure of the server. The user device 102 includes, but is not limited to, a handheld device (such as a mobile phone), a notebook computer, a desktop computer, a vehicle-mounted device, and the like, and the present invention does not limit a specific implementation of the user device 102.

Figure 2B:
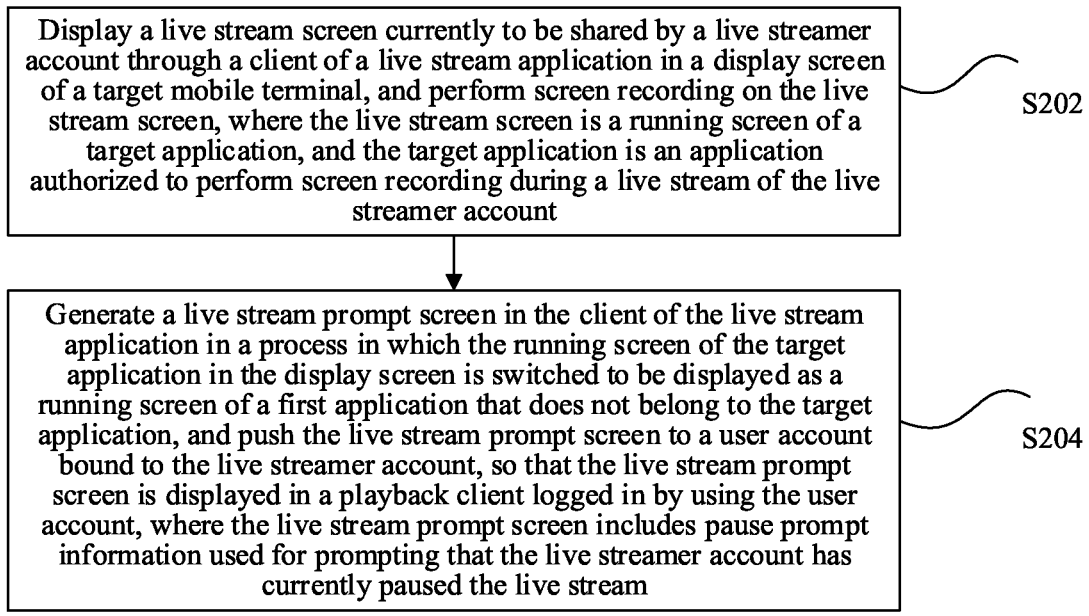
FIG. 2B is a schematic flowchart of a live stream screen display method according to an embodiment of this application.

In some embodiments, as an implementation, as shown in FIG. 2B, the live stream screen display method includes:

S202. Display a live stream screen currently to be shared by a live streamer account through a client of a live stream application in a display screen of a target mobile terminal, and perform screen recording on the live stream screen, where the live stream screen is a running screen of a target application, and the target application is an application authorized to perform screen recording during a live stream of the live streamer account.

S204. Generate a live stream prompt screen in the client of the live stream application in a process in which the running screen of the target application in the display screen is switched to be displayed as a running screen of a first application that does not belong to the target application, and push the live stream prompt screen to a user account watching the live streamer account, so that the live stream prompt screen is displayed in a playback client logged in by using the user account, where the live stream prompt screen includes pause prompt information used for prompting that the live streamer account has currently paused the live stream.

In some embodiments, the live stream screen display method may be, but is not limited to a live stream scenario applied to a mobile terminal. For example, a live streamer account A logs in through the target mobile terminal and starts the live stream client, to perform screen recording on a running screen of one or more applications (target applications) on the target mobile terminal that currently runs the live stream client, and process the running screen obtained through screen recording into a live stream screen and share the live stream screen with a user account B watching the live streamer account A (for example, a user account in a live stream room of the live streamer account A). In addition, one or more applications are only limited to applications that the live streamer account A actively sets or authorizes in default to perform screen recording during the live stream of the live streamer account, or other applications in addition to applications that the live streamer account A actively sets or authorizes in default to perform screen recording during the live stream of the live streamer account. Even after the live streamer account A logs in and starts the live stream client, which is run on the target mobile terminal, screen recording cannot be performed on the running screen and the live scream screen cannot be shared with the user account. A manufacturer may, but is not limited to, determining a current application package name of a user system without authorization to determine and limit recording of the live stream screen.

In some embodiments, the client of the live stream application may be, but is not limited to, the client provided by a live stream platform for starting or viewing the live stream. A live streamer side may be, but is not limited to, performing the live stream through the client of the live stream application installed on the target mobile terminal, while an audience side may be, but is not limited to, viewing live stream screens of different live streamers through the client of the live stream application.

In some embodiments, the live stream screen is generally a screen obtained after acquiring (recording) a running screen on a mobile terminal. However, due to the feature of high privacy of the mobile terminal, for example, functions such as making and receiving a call, sending and receiving a text message, and a personal interactive account, a live stream on the mobile terminal is more likely to lead to a privacy leakage event than a live stream on a personal computer (PC) terminal. Based on this, to overcome the problem that the live stream on the mobile terminal is more likely to lead to a privacy leakage event, acquisition of the running screen is limited. For example, the live streamer account on the live streamer side is pre-configured with a target application authorized to perform screen recording during the live stream of the live streamer account. The target application may be, but is not limited to, being understood as an application with a lower probability of leading to a privacy leakage event by default by the live streamer account, and therefore may be allowed to perform screen recording during the live stream. Other applications in addition to the target application may be, but are not limited to, being understood as applications with a higher probability of leading to a privacy leakage event by default by the live streamer account, and therefore may be prohibited from performing screen recording during the live stream.

Figure 3:
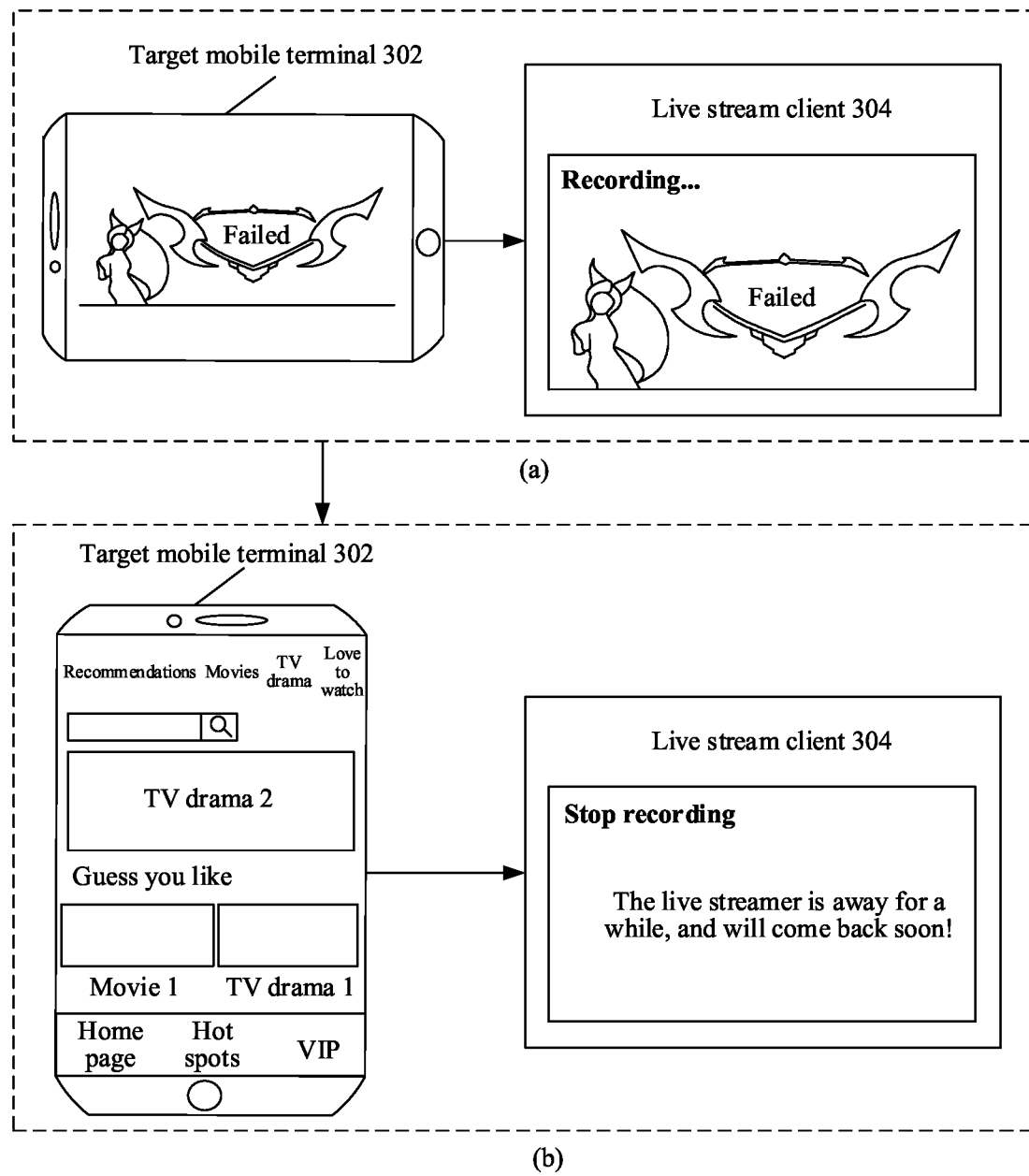
FIG. 3 is a schematic diagram of a live stream screen display method according to an embodiment of this application.

Further, for example, as shown in FIG. 3, it is assumed that a live streamer account performs a live stream of an application A (such as a game application) through a target mobile terminal 302, where the application A belongs to the target application, then records a running screen of the application A that currently run in a foreground (display screen) of the target mobile terminal 302 through a live stream client 304, and shares the recorded running screen with another user account associated with the live streamer account in a form of a live stream screen, as shown by (a) in FIG. 3.

Moreover, when the application currently run in the foreground of the target mobile terminal 302 is switched from the application A to an application B (a film and video application), where the application B does not belong to the target application, a live stream prompt screen (including pause prompt information "The live streamer is away for a while, and will come back soon!") is generated in the target mobile terminal 302 and shared with another user account associated with the live streamer account in a form of a live stream screen, as shown by (b) in FIG. 3.

In some embodiments, in addition to being generated in the client of the live stream application in a process in which the running screen of the target application in the display screen is switched to be displayed as the running screen of the first application that does not belong to the target application, the live stream prompt screen may be, but is not limited to, being generated in a process in which prompt information of another application that does not belong to the target application is displayed on the running screen of the target application in the display screen, or may be, but is not limited to, being generated in the client of the live stream application.

Figure 4:
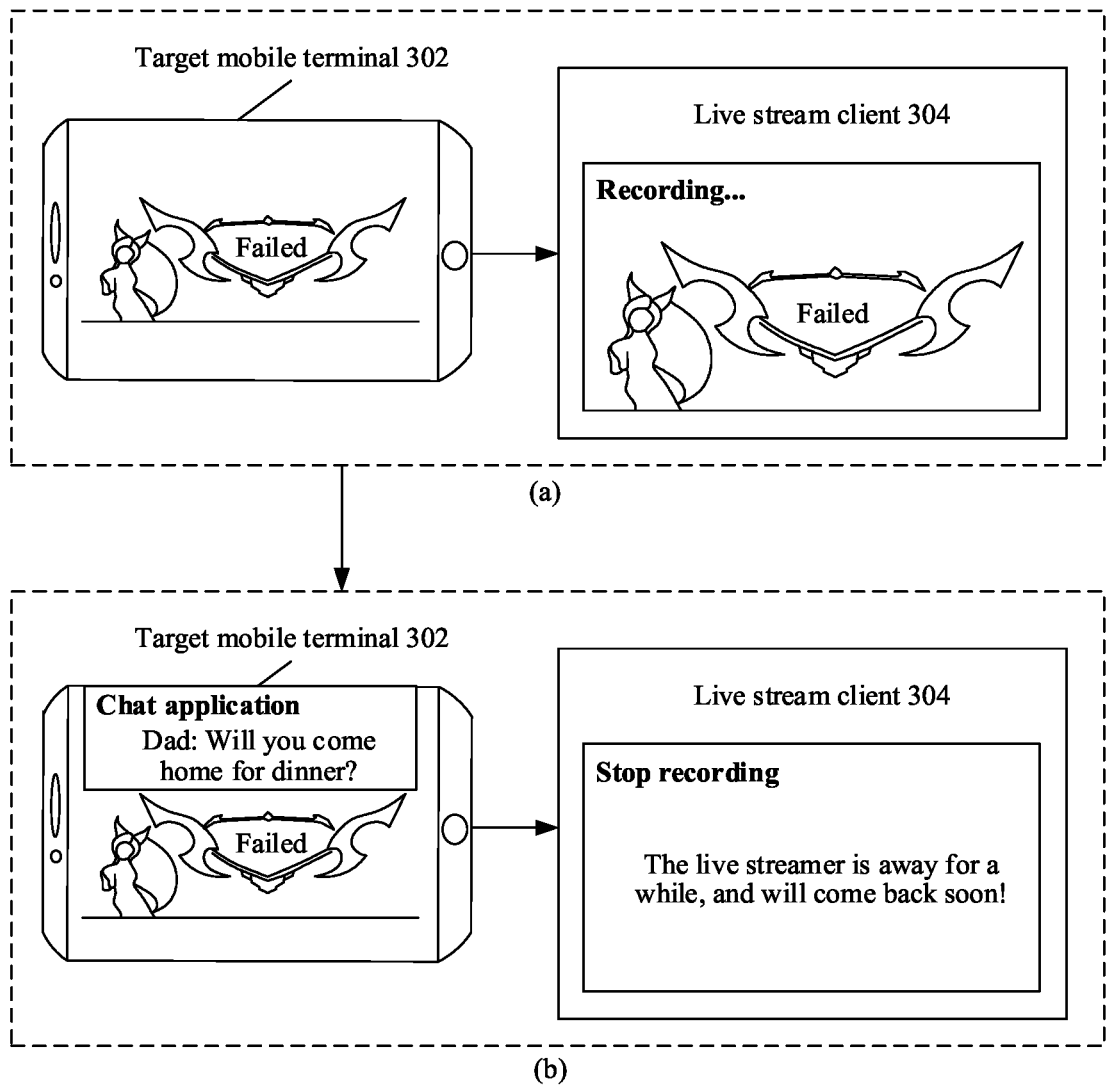
FIG. 4 is a schematic diagram of a live stream screen display method according to an embodiment of this application.

Further, for example, based on the scenario shown in FIG. 3, and still as shown in FIG. 4, it is assumed that the live streamer account performs a live stream of an application A (such as a game application) through the target mobile terminal 302, where the application A belongs to the target application, then records a running screen of the application A currently run in the foreground of the target mobile terminal 302 through the live stream client 304, and shares the recorded running screen with another user account associated with the live streamer account in a form of a live stream screen, as shown by (a) in FIG. 4.

Moreover, the application currently run in the foreground of the target mobile terminal 302 is still the application A, but in a case in which prompt information of an application C (a chat application) is also displayed in the foreground of the target mobile terminal 302, a live stream prompt screen (including pause prompt information "The live streamer is away for a while, and will come back soon!") is generated in the target mobile terminal 302, and the live stream prompt screen is shared with another user account associated with the live streamer account in a form of a live stream screen, as shown by (b) in FIG. 4.

In some embodiments, generation of the live stream prompt screen may be, but is not limited to, dependent on the running screen of the application currently displayed in the display screen, that is, the live stream prompt screen is generated according to the running screen of the application currently displayed in the display screen.

Figure 5:
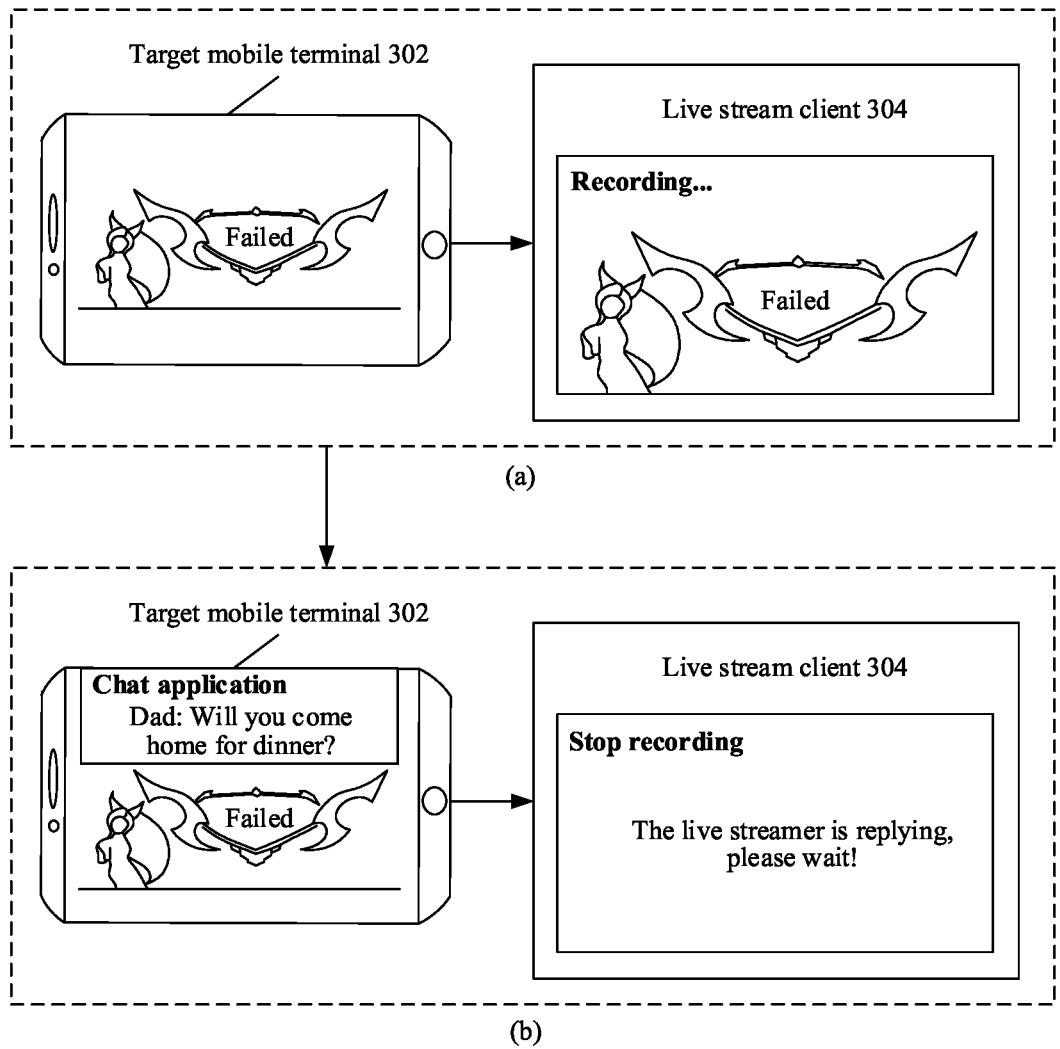
FIG. 5 is a schematic diagram of a live stream screen display method according to an embodiment of this application.

Further, for example, based on the scenario shown in FIG. 3, and still as shown in FIG. 5, it is assumed that the live streamer account performs a live stream of an application A (such as a game application) through the target mobile terminal 302, where the application A belongs to the target application, then records a running screen of the application A currently run in the foreground of the target mobile terminal 302 through the live stream client, and shares the recorded running screen with another user account associated with the live streamer account in a form of a live stream screen, as shown by (a) in FIG. 5.

Moreover, the application currently run in the foreground of the target mobile terminal 302 is still the application A, but in a case in which prompt information of an application C (a chat application) is also displayed in the foreground of the target mobile terminal 302, a live stream prompt screen related to the application C (including pause prompt information "The live streamer is replying, please wait!") is generated in the target mobile terminal 302, and the live stream prompt screen is shared with another user account associated with the live streamer account in a form of a live stream screen, as shown by (b) in FIG. 5.

In addition, in this embodiment, generation of the live stream prompt screen may not be limited to be independent of the running screen of the application currently displayed in the display screen. For example, provided that when the running screen of the target application in the display screen is switched to another application that does not belong to the target application, the same live stream prompt screen is generated in the client of the live stream application, and the live stream prompt screen is pushed to the user account watching the live streamer account, so that the live stream prompt screen is displayed in the playback client logged in by using the user account. In other words, the live stream prompt screen may be, but is not limited to, being kept consistent, or may be changed independently by the live streamer account. For example, the pause prompt information in the live stream prompt screen is modified to improve display flexibility of the live stream prompt screen.

In some embodiments, for determining whether the running screen of the target application in the display screen is switched to be displayed as a running screen belonging to or not belonging to the target application, the following manner may be used, which is not limited: First, a whitelist application (target applications) is set, for example, an application pool is configured through a background, an app (application) name is associated with an app package name, and the mobile terminal pulls the background application pool to display the background application pool to the live streamer side, for the live streamer side to set applications that can be seen during the live stream, and mark whitelist package names to form a whitelist package name list list_1.

Second, when the live streamer side starts the live stream in a created live stream room, an app terminal sends a request to a system to obtain latest usage time of all applications at regular intervals (such as 5 seconds), for example, obtain a latest app package name packagname_1. When the packagname_1 hits a package name in the list_1, the mobile terminal sends a request to the background to pause live streaming, and at the same time a placeholder picture is displayed in the app to replace content of the live stream screen. On the contrary, when the package name_1 does not hit a package name in the list_1, the mobile terminal invokes a screen recording capability of a live stream sdk, records and streams a screen of a live streamer side client to a cloud server, and then streams the screen from the cloud server to audience clients in the live stream room.

In addition, in some embodiments, a manufacturer can determine a current application package name of a user system without authorization, which is used for determining and limiting recording of the live stream screen. Compared with sending a request to the system at regular intervals to obtain the latest usage time of all applications, there is a higher execution efficiency of determining.

During screen recording on a live stream screen currently to be shared by a live streamer account through a client of a live stream application to perform a live stream to a user account watching the live streamer account, in a case in which a running screen of a target application in a display screen is switched to be displayed as a running screen of a first application (unauthorized recording application) that does not belong to the target application (authorized recording application), the running screen of the first application is hidden, and a live stream prompt screen used for prompting that the live streamer account has currently paused the live stream is pushed to the user account watching the live streamer account.

Figure 6:
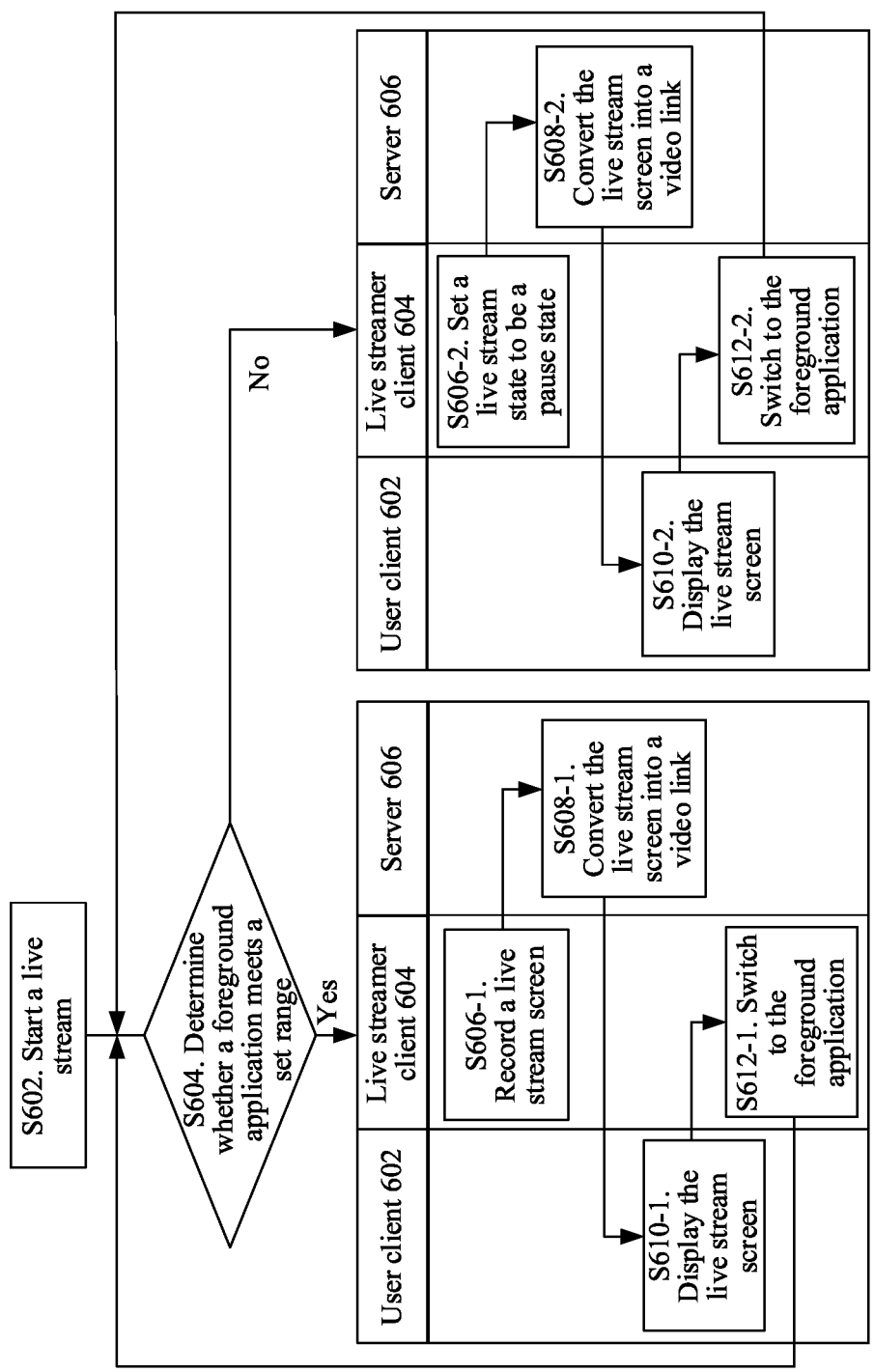
FIG. 6 is a schematic diagram of a live stream screen display method according to an embodiment of this application.

Further, for example, as shown in FIG. 6, assuming that the foregoing live stream screen display method is applied to a live stream scenario in which a server 606 assists in streaming, specific execution steps are as follows:

S602. A live streamer account starts a live stream on a target mobile terminal through a live streamer client 604.

S604. Determine whether an application currently run in a foreground of the target mobile terminal belongs to a set range (or may be understood as whether the application belongs to a target application), if yes, perform step S606-1, and if not, perform step S606-2.

S606-1. Record a running screen of the application currently run in the foreground of the target mobile terminal as a live stream screen to be shared with a user account associated with the live streamer account, where the live stream screen is marked with an identifier 1 of a live stream room in which the live streamer account is located, and a timestamp A used for indicating a start time of recording.

S606-2. Set a live stream state to a pause state, generate a live stream prompt screen in the live streamer client 604, and record a timestamp B of a latest state change.

S608-1. Convert the live stream screen into a video link for the corresponding user account to watch.

S608-2. Convert the live stream screen (live stream prompt screen) into a video link for the corresponding user account to watch.

S6010-1. Perform streaming according to the identifier of the live stream room, and display the live stream screen on a user client 602 (an audience of the live stream room 1) according to the timestamp A.

S6010-2. Perform streaming according to the identifier 1 of the live stream room, and display the live stream screen (live stream prompt screen) on the user client 602 (the audience of the live stream room 1) according to the timestamp B.

S612-1. Continue to perform step S604 in a case of detecting foreground application switching.

S612-2. Continue to perform step S604 in a case of detecting foreground application switching.

Through the embodiments provided by this application, a live stream screen currently to be shared by a live streamer account through a client of a live stream application is displayed in a display screen of a target mobile terminal, and screen recording is performed on the live stream screen, where the live stream screen is a running screen of a target application, and the target application is an application authorized to perform screen recording during a live stream of the live streamer account. In a process in which the running screen of the target application in the display screen is switched to be displayed as a running screen of a first application that does not belong to the target application, a live stream prompt screen is generated in the client of the live stream application, and the live stream prompt screen is pushed to a user account watching the live streamer account, so that the live stream prompt screen is displayed on a playback client logged in by using the user account, where the live stream prompt screen includes pause prompt information used for prompting that the live streamer account has currently paused the live stream, which achieves the technical purpose of automatically hiding a running screen of an unauthorized recording application during live stream screen display, thereby implementing the technical effect of improving controllability of privacy protection during live stream screen display.

In a solution, after the displaying a live stream screen currently to be shared by a live streamer account through a client of a live stream application in a display screen of a target mobile terminal, the method further includes:

determining that the running screen of the target application in the display screen is switched to the running screen of the first application when it is identified that an application identifier currently displayed in the display screen is switched from an application identifier of the target application to an application identifier of the first application.

In some embodiments, application switching may trigger, but not limited to, a corresponding switching instruction, and the switching instruction carries an application identifier of a switched target. In addition, considering that the application switching may not trigger a corresponding switching instruction, whether the application identifier currently displayed in the display screen is the application identifier of the target application needs to be identified at fixed time or in real time. For example, when it is identified that the application identifier currently displayed in the display screen is switched from the application identifier of the target application to the application identifier of the first application, it is determined that the running screen of the target application in the display screen is switched to be displayed as the running screen of the first application.

In a solution, the generating a live stream prompt screen used for screen recording in the client of the live stream application in a process in which the running screen of the target application in the display screen is switched to be displayed as a running screen of a first application that does not belong to the target application includes:

generating the live stream prompt screen based on the pause prompt information during a time period in which the application identifier currently displayed in the display screen is switched to the application identifier of the first application, and using the live stream prompt screen as a screen to be recorded within the time period. In some embodiments, the time period is terminated after a user of the target mobile terminal performs a predefined operation on the first application.

In some embodiments, descriptions are made from a time dimension. Assuming that recording of the target application starts from time 1, and a time at which the application identifier currently displayed in the display screen is switched to the application identifier of the first application is time 2, a live stream screen generated based on the running screen of the target application from time 1 to time 2 is generated, and a live stream prompt screen generated based on the pause prompt information within a time period in which the application identifier currently displayed in the display screen is switched to the application identifier of the first application starting from time 2 is generated.

Further, assuming that the application identifier currently displayed in the display screen is switched to the application identifier of the target application at time 3, a live stream screen generated based on the running screen of the target application within a time period in which the application identifier currently displayed in the display screen is switched to the application identifier of the target application starting from time 3 is generated.

In a solution, before the displaying a live stream screen currently to be shared by a live streamer account through a client of a live stream application in a display screen of a target mobile terminal, and performing screen recording on the live stream screen, or during the displaying a live stream screen currently to be shared by a live streamer account through a client of a live stream application in a display screen of a target mobile terminal, the method includes:

S1. Display a live stream configuration interface in the client of the live stream application in response to a configuration trigger operation.

S2. Obtain the target application in response to a target configuration operation triggered on the live stream configuration interface.

In some embodiments, the configuration trigger operation may be triggered at any moment before the live stream, during the live stream, or after the live stream, which is not limited herein. The same is true for triggering of the target configuration operation.

Figure 7:
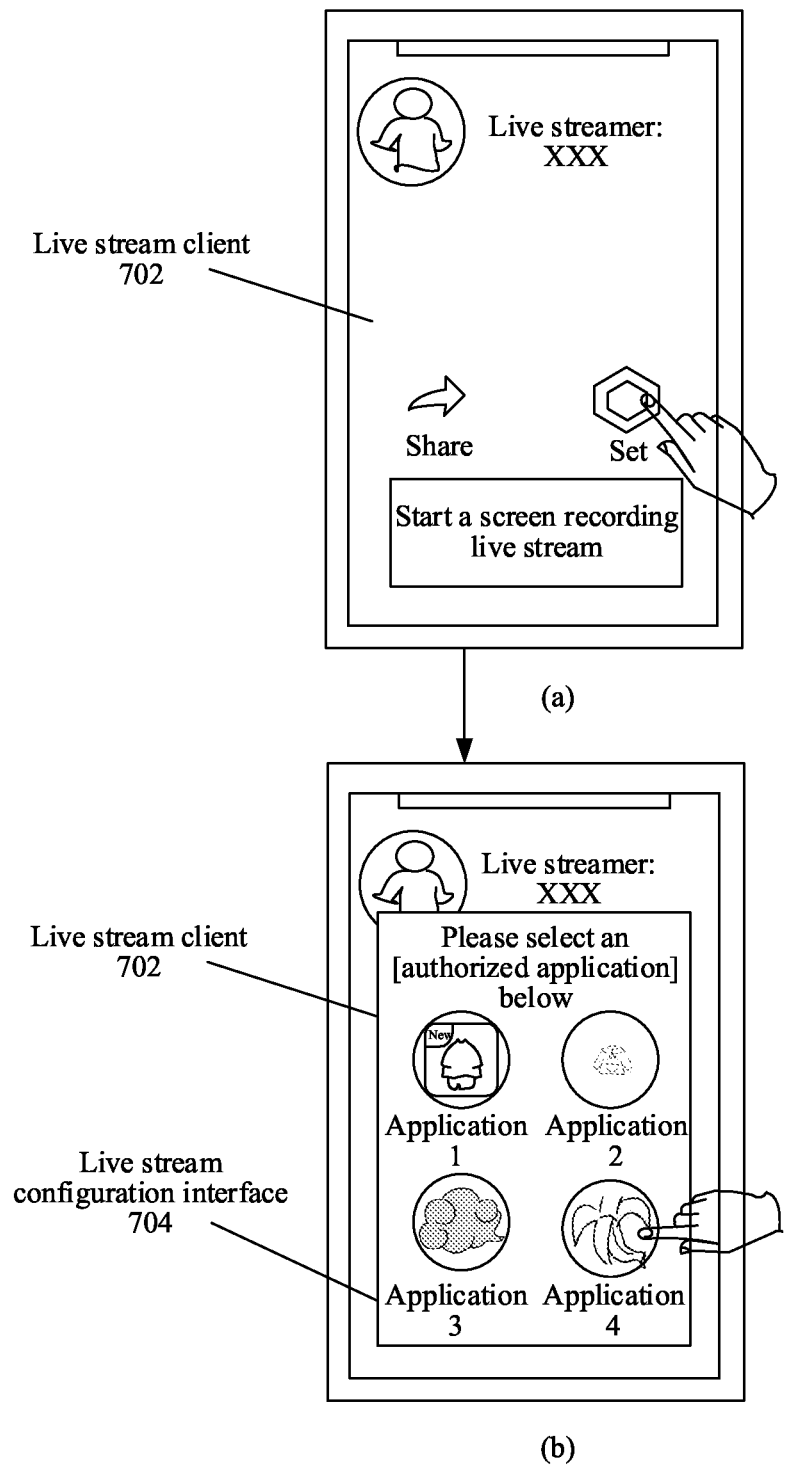
FIG. 7 is a schematic diagram of a live stream screen display method according to an embodiment of this application.

Further, for example, as shown in FIG. 7, assuming that before a screen recording live stream is started (before a live stream screen currently to be shared by a live streamer account through a client of a live stream application is displayed in a display screen of a target mobile terminal, and screen recording is performed on the live stream screen), a live streamer XXX intends to make a relevant setting for the to-be-started screen recording live stream (If no setting is made, it is a last setting configuration by default, and if it is the first setting and no setting is made, a default setting configuration is used as a live stream setting of the current screen recording live stream), a selection operation is triggered on a virtual button "setting" on a live stream client 702 to complete triggering of a configuration trigger operation. For details, reference may be made to (a) in FIG. 7.

Moreover, as shown by (b) in FIG. 7, a live stream configuration interface 704 is displayed on the live stream client 702 in response to triggering of the configuration trigger operation, where a plurality of application identifiers to be authorized are displayed on the live stream configuration interface 704. Further, assuming that a selection operation is detected on an application identifier corresponding to an application 4, the selection operation is considered as triggering of the target configuration operation, and the application 4 is determined as an authorized application (target application).

Through the embodiments provided in this application, the live stream configuration interface is displayed in the client of the live stream application in response to the configuration trigger operation. The target application is obtained in response to the target configuration operation triggered on the live stream configuration interface, so that a purpose that the target application can be configured flexibly at a plurality of times is achieved, and an effect of improving configuration flexibility of the target application is achieved.

In a solution, the obtaining the target application in response to a target configuration operation triggered on the live stream configuration interface includes:

S1. Display a first identifier set in response to a first configuration operation triggered on the live stream configuration interface, where identifiers in the first identifier set are application identifiers of applications that are authorized to perform a live stream in the client of the live stream application, but have not been authorized to perform screen recording during the live stream of the live streamer account.

S2. Determine, in response to a first selection operation performed on a first identifier in the first identifier set, an application corresponding to the first identifier as the target application.

In some embodiments, a to-be-selected application to be determined as the target application in the first identifier set may be, but is not limited to, an application that has/has not been installed in the target mobile terminal.

Further, for example, when the first identifier set only includes all or some of applications installed in the target mobile terminal, a candidate application set formed by all applications installed in the target mobile terminal is obtained before the first identifier set is displayed in response to the first configuration operation triggered on the live stream configuration interface, and then the applications that are authorized to perform a live stream in the client of the live stream application, but have not been authorized to perform screen recording during the live stream of the live streamer account are used as screening conditions to screen a plurality of applications that meet the screening conditions from the candidate application set, and then application identifiers corresponding to the plurality of applications are used to form the first identifier set.

As a solution, the obtaining the target application in response to a target configuration operation triggered on the live configuration interface includes:

S1. Display a second identifier set in response to a second configuration operation triggered on the live stream configuration interface, where identifiers in the second identifier set are application identifiers of applications that are authorized to perform a live stream in the client of the live stream application, and are also authorized to perform screen recording during the live stream of the live streamer account.

S2. Cancel, in response to a second selection operation performed on a second identifier in the second identifier set, an application corresponding to the second identifier as the target application.

In some embodiments, the target application that has been authorized to perform screen recording during the live stream of the live streamer account can cancel authorization through the second configuration operation. For example, if an application A has been authorized to belong to the target application, but authorization of the application A can be canceled through the second configuration operation, the application A whose authorization is canceled does not belong to the target application.

According to the embodiments provided by this application, a second identifier set is displayed in response to a second configuration operation triggered on the live stream configuration interface, where identifiers in the second identifier set are application identifiers of applications that are authorized to perform a live stream in the client of the live stream application, and are also authorized to perform screen recording during the live stream of the live streamer account. The application corresponding to the second identifier is canceled as the target application in response to the second selection operation performed on the second identifier in the second identifier set, so that a purpose of flexibly configuring the target application by canceling authorization is achieved, and an effect of improving configuration flexibility of the target application is achieved.

In a solution, after the pushing the live stream prompt screen to a user account watching the live streamer account, the method further includes:

continuing to display the live stream screen formed by the running screen of the target application when the running screen of the first application in the display screen is resumed to be displayed as the running screen of the target application, and performing screen recording on the live stream screen.

When the running screen of the first application in the display screen is resumed to be displayed as the running screen of the target application, the live stream screen formed by the running screen of the target application continues to be displayed, and screen recording is performed on the live stream screen.

Figure 8:
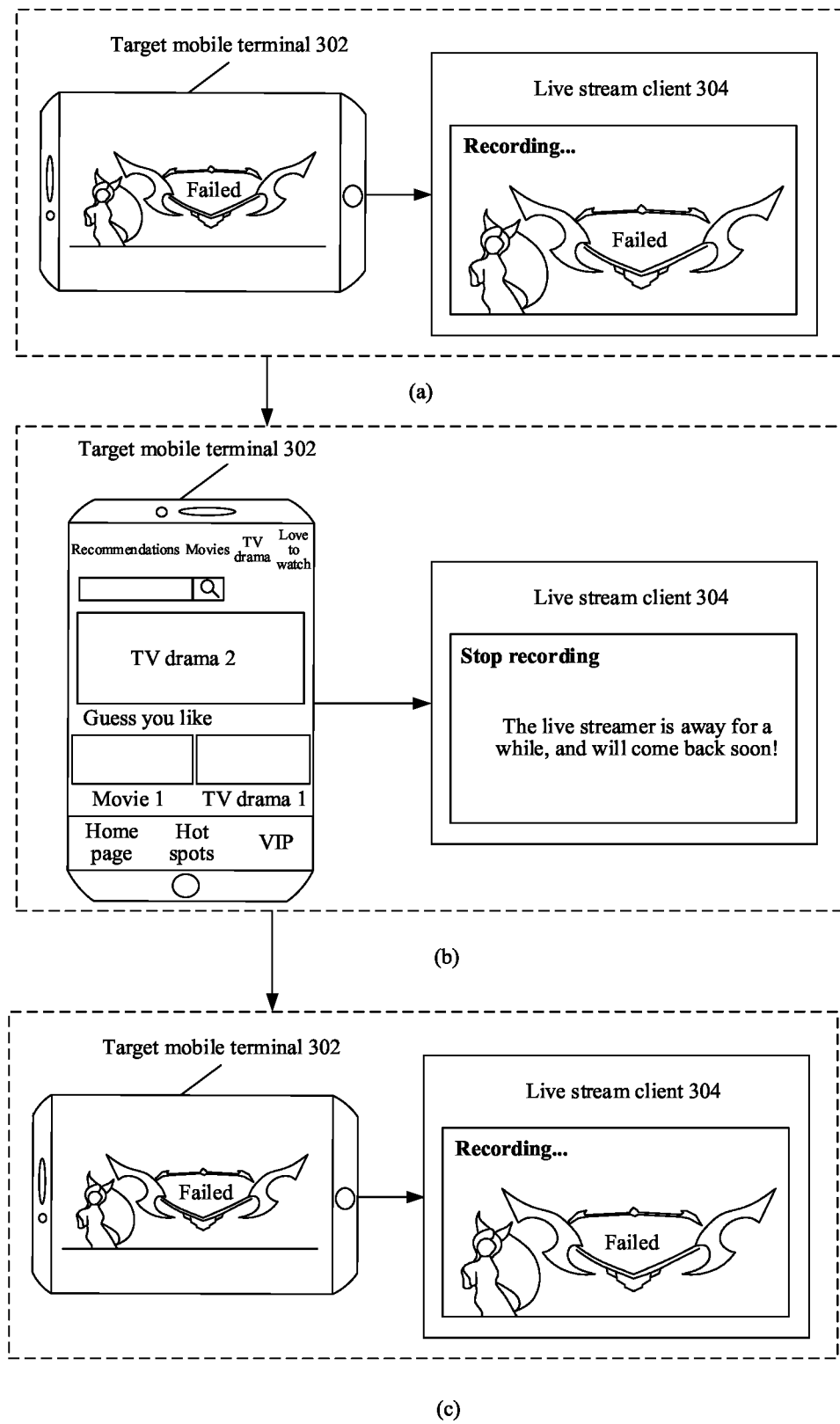
FIG. 8 is a schematic diagram of a live stream screen display method according to an embodiment of this application.

Further, for example, based on the scenario shown in FIG. 3, and still as shown in FIG. 8, it is assumed that the live streamer account performs a live stream of an application A (such as a game application) through the target mobile terminal 302, where the application A belongs to the target application, records a running screen of the application A currently run in the foreground (display screen) of the target mobile terminal 302 through the live stream client 304, and shares the recorded running screen with another user account associated with the live streamer account in a form of a live stream screen, as shown by (a) in FIG. 8.

Moreover, when the application currently run in the foreground of the target mobile terminal 302 is switched from the application A to an application B (a film and video application), where the application B does not belong to the target application, a live stream prompt screen (including pause prompt information "The live streamer is away for a while, and will come back soon!") is generated in the target mobile terminal 302 and shared with another user account associated with the live streamer account in a form of a live stream screen, as shown by (b) in FIG. 8.

In addition, when the application currently run on the foreground of the target mobile terminal 302 is switched back from the application B to the application A, it may be, but is not limited to, (c) shown in FIG. 8, recording of the application A is resumed, and the recorded running screen is shared with the user account as the live stream screen.

Through the embodiments provided in this application, when the running screen of the first application in the display screen is resumed to be displayed as the running screen of the target application, the live stream screen formed by the running screen of the target application continues to be displayed, and screen recording is performed on the live stream screen, which improves an effect of integrity of a live stream process.

In a solution, before the displaying a live stream screen currently to be shared by a live streamer account through a client of a live stream application in a display screen of a target mobile terminal, and performing screen recording on the live stream screen, the method includes:

S1. Determine a second application currently run in the display screen of the target mobile terminal in response to a live stream start request of the live streamer account triggered on the target mobile terminal.

S2. Generate a live stream prompt screen in the client of the live stream application when the second application does not belong to the target application, and push the live stream prompt screen to the user account watching the live streamer account to display the live stream prompt screen in the playback client.

S3. Display a running screen of the second application in the display screen of the target mobile terminal when the second application belongs to the target application, and perform screen recording on the running screen of the second application.

The second application currently run in the display screen of the target mobile terminal is determined in response to the live stream start request of the live streamer account triggered on the target mobile terminal. When the second application belongs to the target application, the running screen of the second application is displayed in the display screen of the target mobile terminal, and screen recording is performed on the running screen of the second application.

Figure 9:
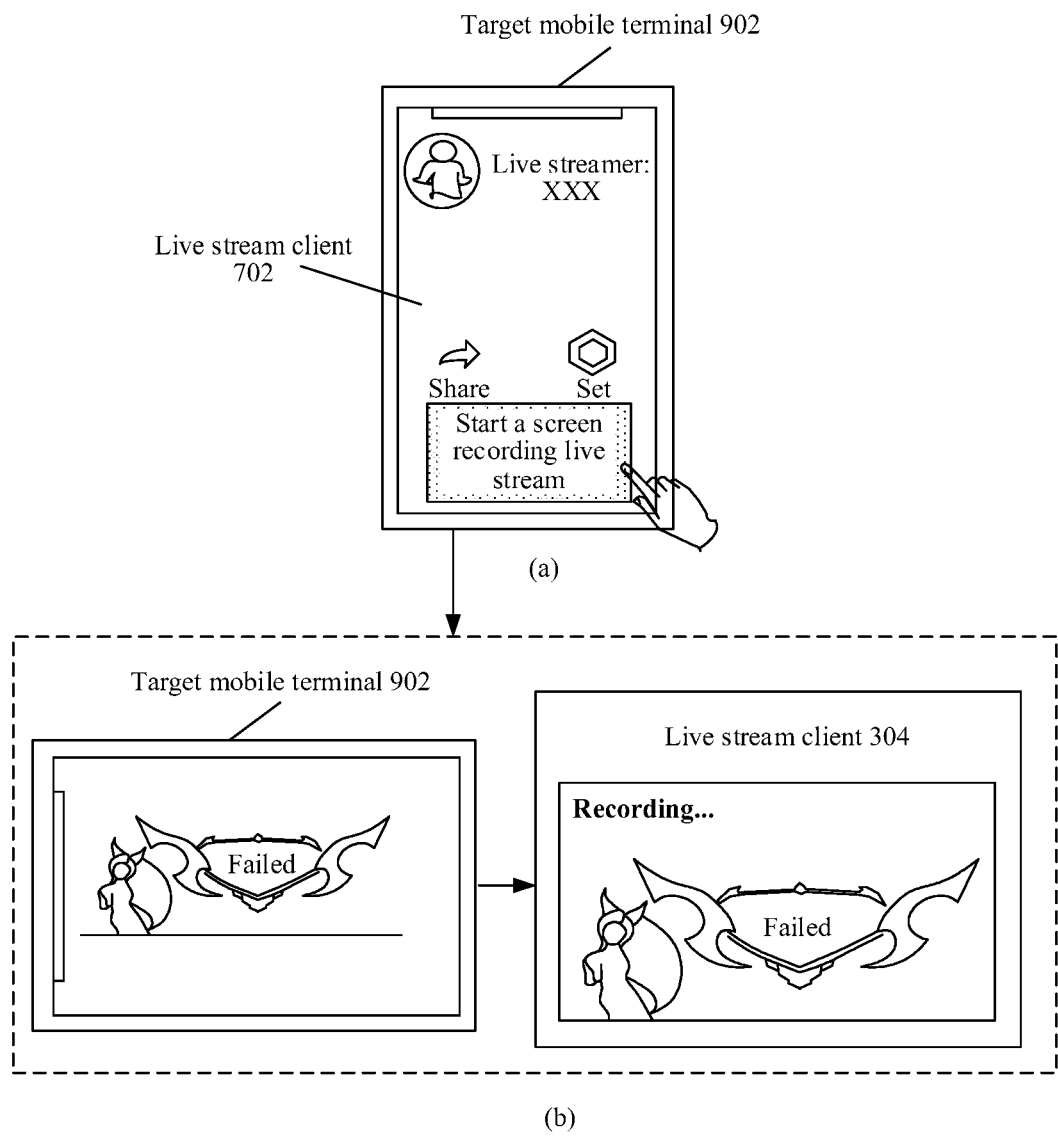
FIG. 9 is a schematic diagram of a live stream screen display method according to an embodiment of this application.

Further, for example, based on the scenario shown in FIG. 7, and still as shown in FIG. 9, it is assumed that a live stream start request used for instructing to start a screen recording live stream is detected on the live stream client 702, and whether the application (second application) currently run in a foreground of a target mobile terminal 902 belongs to the target application is further determined. When the application currently run in the foreground of the target mobile terminal 902 belongs to the target application, as shown by (b) in FIG. 9, a running screen of the second application is displayed in a display screen of the target mobile terminal 902, and screen recording is performed on the running screen of the second application.

The second application currently run in the display screen of the target mobile terminal is determined in response to the live stream start request of the live streamer account triggered on the target mobile terminal. When the second application does not belong to the target application, a live stream prompt screen is generated in the client of the live stream application, and the live stream prompt screen is pushed to the user account watching the live streamer account to display the live stream prompt screen in the playback client.

Figure 10:
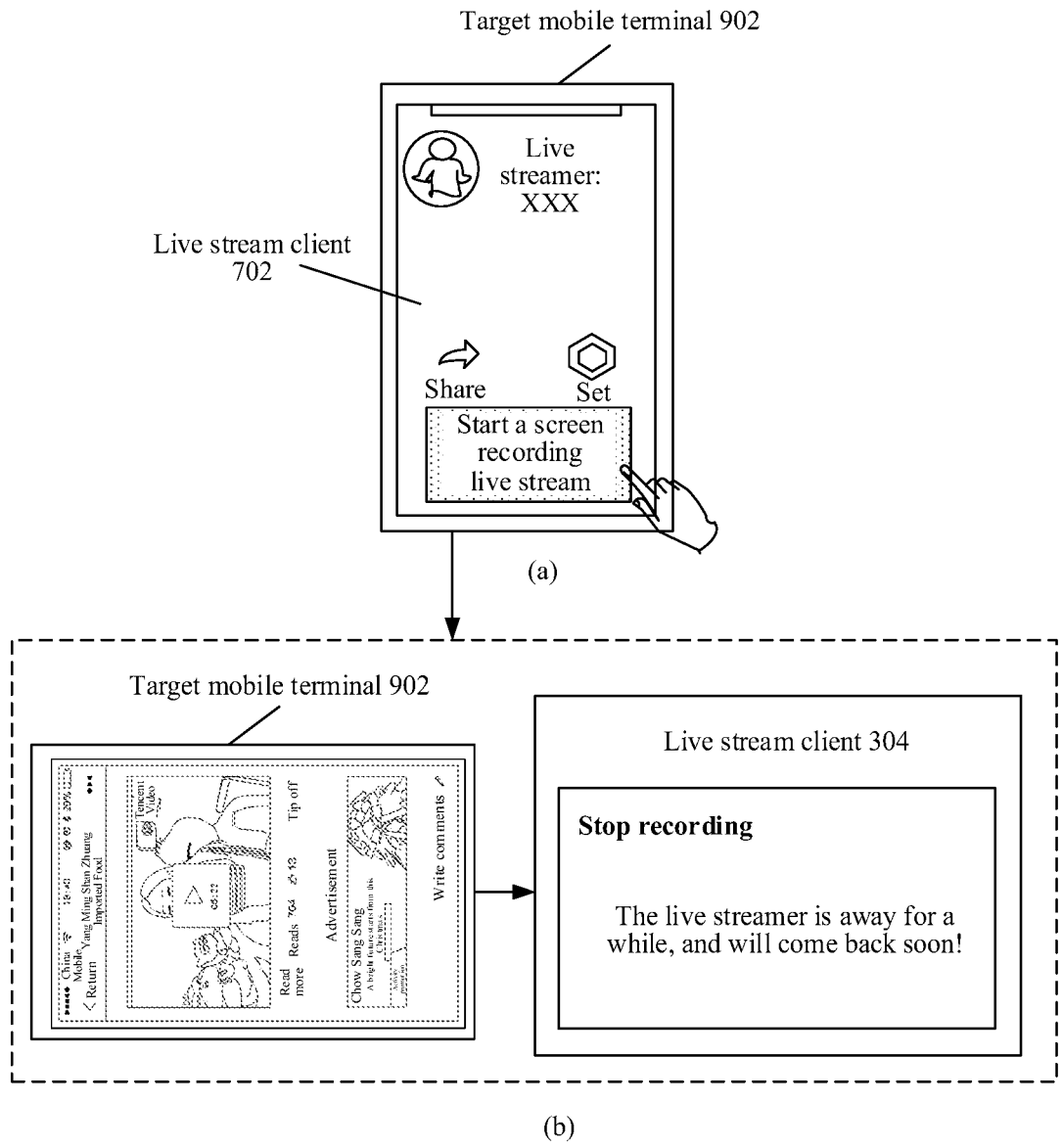
FIG. 10 is a schematic diagram of a live stream screen display method according to an embodiment of this application.

Further, for example, based on the scenario shown in FIG. 7, and still as shown in FIG. 10, it is assumed that the live stream start request used for instructing to start a screen recording live stream is detected on the live stream client 702, and whether the application (second application) currently run in the foreground of the target mobile terminal 902 belongs to the target application is further determined. When the application currently run in the foreground of the target mobile terminal 902 does not belong to the target application, as shown by (b) in FIG. 10, a live stream prompt screen is generated in the live stream client 702 (the client of the live stream application) and the live stream prompt screen is pushed to the user account watching the live streamer account to display the live stream prompt screen in the playback client. For ease of description, the foregoing method embodiments are described as a series of action combinations. However, a person skilled in the art is to know that the present invention is not limited to the described order of the actions because some steps may be performed in another order or performed at the same time according to the present invention. In addition, a person skilled in the art is also to learn that the embodiments described in this specification are all exemplary embodiments, and the involved actions and modules are not necessarily required to the present invention. An embodiment of this application further provides a live stream screen display apparatus for implementing the foregoing live stream screen display method. The apparatus may include:

a first recording unit, configured to obtain a running screen of a target application displayed on a display screen of a target mobile terminal used by a live streamer account, and push the running screen to a playback client corresponding to a user account watching the live streamer account as a live stream screen; and a generation unit, configured to stop pushing the screen displayed in the display screen of the target mobile terminal to the playback client when the running screen of the target application in the display screen is affected by (e.g., partially covered by or completely switched to) a running screen of a first application that does not belong to at least one preset target application, and push a live stream prompt screen to the playback client as a live stream screen, the live stream prompt screen including pause prompt information used for prompting that the live streamer account has currently paused the live stream.

In some embodiments, the apparatus further includes:

a first determining unit, configured to determine an application to which the screen displayed in the display screen of the target mobile terminal belongs; and trigger the first recording unit to perform the operation of obtaining a running screen of a target application displayed in a display screen of a target mobile terminal used by a live streamer account when the application is one of at least one preset target application.

Figure 11:
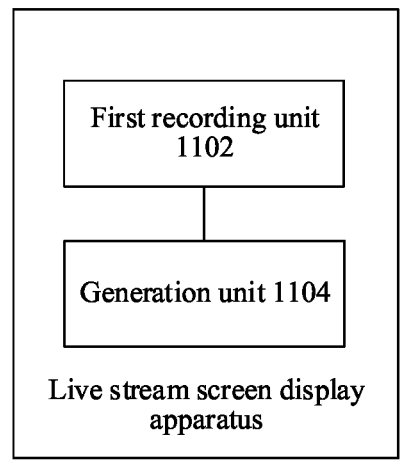
FIG. 11 is a schematic diagram of a live stream screen display apparatus according to an embodiment of this application.

In some embodiments, as shown in FIG. 11, the apparatus includes:

a first recording unit 1102, configured to display a live stream screen currently to be shared by a live streamer account through a client of a live stream application in a display screen of a target mobile terminal, and perform screen recording on the live stream screen, where the live stream screen is a running screen of a target application, and the target application is an application authorized to perform screen recording during a live stream of the live streamer account; and a generation unit 1104, configured to generate the live stream prompt screen in the client of the live stream application in a process in which the running screen of the target application in the display screen is switched to be displayed as the running screen of the first application that does not belong to the target application, and push the live stream prompt screen to the user account watching the live streamer account, so that the live stream prompt screen is displayed on the playback client logged in by using the user account, where the live stream prompt screen includes pause prompt information used for prompting that the live streamer account has currently paused the live stream.

In some embodiments, the foregoing live stream screen display apparatus may be, but is not limited to, being applied to a live stream scenario of a mobile terminal. For example, a live streamer account A logs in through the target mobile terminal and starts a live stream client to perform screen recording on a running screen of one or more applications (target applications) on the target mobile terminal currently run in the live stream client, and processes the running screen obtained through screen recording into a live stream screen and shares the live stream screen with a user account B (for example, a user account located in a live stream room of the live streamer account A) watching the live streamer account A. In addition, one or more applications are limited to the applications that the live streamer account A actively sets or authorizes in default to perform screen recording during the live stream of the live streamer account, or other applications in addition to applications that the live streamer account A actively sets or authorizes in default to perform screen recording during the live stream of the live streamer account. Even after the live streamer account A logs in and starts the live stream client, which is run on the target mobile terminal, screen recording cannot be performed on the running screen and the live scream screen cannot be shared with the user account. A manufacturer may, but is not limited to, determining a current application package name of a user system without authorization to determine and limit recording of the live stream screen.

In some embodiments, the client of the live stream application may be, but is not limited to, the client provided by a live stream platform for starting or viewing the live stream. A live streamer side may be, but is not limited to, performing the live stream through the client of the live stream application installed on the target mobile terminal, while an audience side may be, but is not limited to, viewing live stream screens of different live streamers through the client of the live stream application.

In some embodiments, the live stream screen is generally a screen obtained after acquiring (recording) a running screen on a mobile terminal. However, due to the feature of high privacy of the mobile terminal, for example, functions such as making and receiving a call, sending and receiving a text message, and a personal interactive account, a live stream on the mobile terminal is more likely to lead to a privacy leakage event than a live stream on a personal computer (PC) terminal. Based on this, to overcome the problem that the live stream on the mobile terminal is more likely to lead to a privacy leakage event, acquisition of the running screen is limited. For example, the live streamer account on the live streamer side is pre-configured with a target application authorized to perform screen recording during the live stream of the live streamer account. The target application may be, but is not limited to, being understood as an application with a lower probability of leading to a privacy leakage event by default by the live streamer account, and therefore may be allowed to perform screen recording during the live stream. Other applications in addition to the target application may be, but are not limited to, being understood as applications with a higher probability of leading to a privacy leakage event by default by the live streamer account, and therefore may be prohibited from performing screen recording during the live stream.

In some embodiments, in addition to being generated in the client of the live stream application in a process in which the running screen of the target application in the display screen is switched to be displayed as the running screen of the first application that does not belong to the target application, the live stream prompt screen may be, but is not limited to, being generated in a process in which prompt information of another application that does not belong to the target application is displayed on the running screen of the target application in the display screen, or may be, but is not limited to, being generated in the client of the live stream application.

In some embodiments, generation of the live stream prompt screen may be, but is not limited to, dependent on the running screen of the application currently displayed in the display screen, that is, the live stream prompt screen is generated according to the running screen of the application currently displayed in the display screen.

In addition, in this embodiment, generation of the live stream prompt screen may not be limited to be independent of the running screen of the application currently displayed in the display screen. For example, provided that when the running screen of the target application in the display screen is switched to another application that does not belong to the target application, the same live stream prompt screen is generated in the client of the live stream application, and the live stream prompt screen is pushed to the user account watching the live streamer account, so that the live stream prompt screen is displayed in the playback client logged in by using the user account. In other words, the live stream prompt screen may be, but is not limited to, being kept consistent, or may be changed independently by the live streamer account. For example, the pause prompt information in the live stream prompt screen is modified to improve display flexibility of the live stream prompt screen.

In some embodiments, for determining whether the running screen of the target application in the display screen is switched to be displayed as a running screen belonging to or not belonging to the target application, the following manner may be used, which is not limited: First, a whitelist application (target applications) is set, for example, an application pool is configured through a background, an app (application) name is associated with an app package name, and the mobile terminal pulls the background application pool to display the background application pool to the live streamer side, for the live streamer side to set applications that can be seen during the live stream, and mark whitelist package names to form a whitelist package name list list_1.

Second, when the live streamer side starts the live stream in a created live stream room, an app terminal sends a request to a system to obtain latest usage time of all applications at regular intervals (such as 5 seconds), for example, obtain a latest app package name packagname 1. When the packagname_1 hits a package name in the list_1, the mobile terminal sends a request to the background to pause live streaming, and at the same time a placeholder picture is displayed in the app to replace content of the live stream screen. On the contrary, when the package name_1 does not hit a package name in the list_1, the mobile terminal invokes a screen recording capability of a live stream sdk, records and streams a screen of a live streamer side client to a cloud server, and then streams the screen from the cloud server to audience clients in the live stream room.

In addition, in some embodiments, a manufacturer can determine a current application package name of a user system without authorization, which is used for determining and limiting recording of the live stream screen. Compared with sending a request to the system at regular intervals to obtain the latest usage time of all applications, there is a higher execution efficiency of determining.

During screen recording on a live stream screen currently to be shared by a live streamer account through a client of a live stream application to perform a live stream to a user account watching the live streamer account, in a case in which a running screen of a target application in a display screen is switched to be displayed as a running screen of a first application (unauthorized recording application) that does not belong to the target application (authorized recording application), the running screen of the first application is hidden, and a live stream prompt screen used for prompting that the live streamer account has currently paused the live stream is pushed to the user account watching the live streamer account.

For specific embodiments, reference may be made to the example shown in the foregoing live stream screen display method, and details are not repeated in this example.

Through the embodiments provided by this application, a live stream screen currently to be shared by a live streamer account through a client of a live stream application is displayed in a display screen of a target mobile terminal, and screen recording is performed on the live stream screen, where the live stream screen is a running screen of a target application, and the target application is an application authorized to perform screen recording during a live stream of the live streamer account. In a process in which the running screen of the target application in the display screen is switched to be displayed as a running screen of a first application that does not belong to the target application, a live stream prompt screen is generated in the client of the live stream application, and the live stream prompt screen is pushed to a user account watching the live streamer account, so that the live stream prompt screen is displayed on a playback client logged in by using the user account, where the live stream prompt screen includes pause prompt information used for prompting that the live streamer account has currently paused the live stream, which achieves the technical purpose of automatically hiding a running screen of an unauthorized recording application during live stream screen display, thereby implementing the technical effect of improving controllability of privacy protection during live stream screen display.

In a solution, the apparatus includes:

a first determining unit, configured to, after the live stream screen currently to be shared by the live streamer account through the client of the live stream application is displayed in the display screen of the target mobile terminal, determine that the running screen of the target application in the display screen is switched to be displayed as the running screen of the first application when it is identified that an application identifier currently displayed in the display screen is switched from an application identifier of the target application to an application identifier of the first application.

For specific embodiments, reference may be made to the example shown in the foregoing live stream screen display method, and details are not repeated in this example.

In a solution, the generation unit 1104 includes:

a generation module, configured to generate the live stream prompt screen based on the pause prompt information during a time period in which the application identifier currently displayed in the display screen is switched to the application identifier of the first application, and use the live stream prompt screen as a screen to be recorded within the time period.

For specific embodiments, reference may be made to the example shown in the foregoing live stream screen display method, and details are not repeated in this example.

In a solution, the apparatus includes:

a first display unit, configured to, before the live stream screen currently to be shared by the live streamer account through the client of the live stream application is displayed in the display screen of the target mobile terminal, and screen recording is performed on the live stream screen, or in a process in which the live stream screen currently to be shared by the live streamer account through the client of the live stream application is displayed in the display screen of the target mobile terminal, display a live stream configuration interface in the client of the live stream application in response to a configuration trigger operation; and an obtaining unit, configured to, before the live stream screen currently to be shared by the live streamer account through the client of the live stream application is displayed in the display screen of the target mobile terminal, and screen recording is performed on the live stream screen, or in a process in which the live stream screen currently to be shared by the live streamer account through the client of the live stream application is displayed in the display screen of the target mobile terminal, obtain the target application in response to a target configuration operation triggered on the live stream configuration interface.

For specific embodiments, reference may be made to the example shown in the foregoing live stream screen display method, and details are not repeated in this example.

In a solution, the obtaining unit includes:

a first display module, configured to display a first identifier set in response to a first configuration operation triggered on the live stream configuration interface, where identifiers in the first identifier set are application identifiers of applications that are authorized to perform a live stream in the client of the live stream application, but have not been authorized to perform screen recording during a live stream of the live streamer account; and a determining module, configured to determine, in response to a first selection operation performed on a first identifier in the first identifier set, an application corresponding to the first identifier as the target application.

For specific embodiments, reference may be made to the example shown in the foregoing live stream screen display method, and details are not repeated in this example.

In a solution, the obtaining units includes:

a second display module, configured to display a second identifier set in response to a second configuration operation triggered on the live stream configuration interface, where identifiers in the second identifier set are application identifiers of applications that are authorized to perform a live stream in the client of the live stream application, and are also authorized to perform screen recording during the live stream of the live streamer account; and a cancellation module, configured to cancel, in response to a second selection operation performed on a second identifier in the second identifier set, an application corresponding to the second identifier as the target application.

For specific embodiments, reference may be made to the example shown in the foregoing live stream screen display method, and details are not repeated in this example.

In a solution, the apparatus further includes:

a second display unit, configured to, after the live stream prompt screen is pushed to the user account watching the live streamer account, continue to display the live stream screen formed by the running screen of the target application when the running screen of the first application in the display screen is resumed to be displayed as the running screen of the target application, and perform screen recording on the live stream screen.

For specific embodiments, reference may be made to the example shown in the foregoing live stream screen display method, and details are not repeated in this example.

In a solution, the apparatus includes:

a second determining unit, configured to, before the live stream screen currently to be shared by the live streamer account through the client of the live stream application is displayed in the display screen of the target mobile terminal, and screen recording is performed on the live stream screen, determine a second application currently run in the display screen of the target mobile terminal in response to a live stream start request of the live streamer account triggered on the target mobile terminal;

a third display unit, configured to, before the live stream screen currently to be shared by the live streamer account through the client of the live stream application is displayed in the display screen of the target mobile terminal, and screen recording is performed on the live stream screen, generate a live stream prompt screen in the client of the live stream application when the second application does not belong to the target application, and push the live stream prompt screen to the user account watching the live streamer account to display the live stream prompt screen in the playback client; and a second recording unit, configured to, before the live stream screen currently to be shared by the live streamer account through the client of the live stream application is displayed in the display screen of the target mobile terminal, and screen recording is performed on the live stream screen, display a running screen of the second application in the display screen of the target mobile terminal when the second application belongs to the target application, and perform screen recording on the running screen of the second application.

Figure 12:
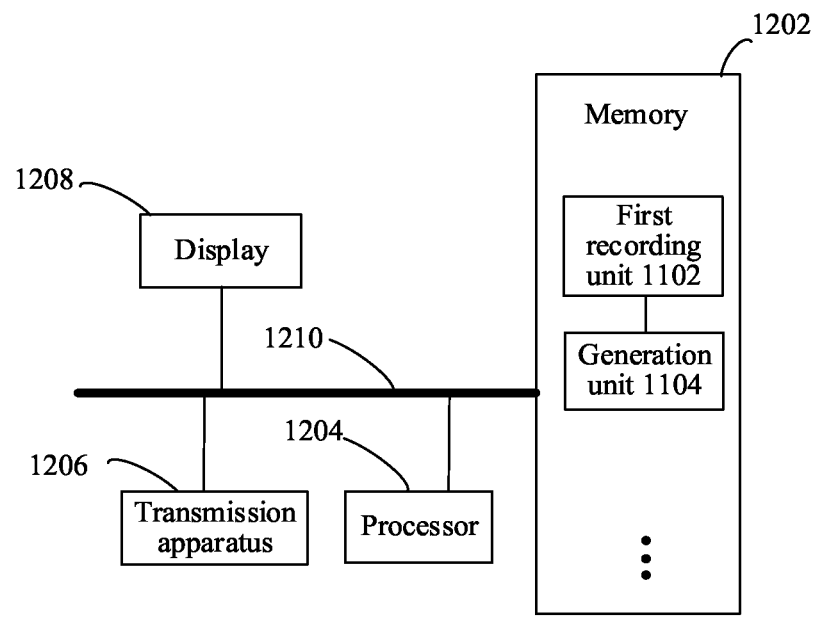
FIG. 12 is a schematic structural diagram of an electronic device according to an embodiment of this application.

For specific embodiments, reference may be made to the example shown in the foregoing live stream screen display method, and details are not repeated in this example. According to another aspect of the embodiments of this application, an electronic device for implementing the foregoing live stream screen display method is further provided. As shown in FIG. 12, the electronic device includes a memory 1202 and a processor 1204, the memory 1202 storing a computer program, and the processor 1204 being configured to perform steps in any method embodiment through the computer program.

In some embodiments, the electronic device may be located in at least one of a plurality of network devices in a computer network.

In some embodiments, the processor may be configured to perform the following steps by executing the computer program.

S1. Display a live stream screen currently to be shared by a live streamer account through a client of a live stream application in a display screen of a target mobile terminal, and perform screen recording on the live stream screen, where the live stream screen is a running screen of a target application, and the target application is an application authorized to perform screen recording during a live stream of the live streamer account.

S2. Generate a live stream prompt screen in the client of the live stream application in a process in which the running screen of the target application in the display screen is switched to be displayed as a running screen of a first application that does not belong to the target application, and push the live stream prompt screen to a user account watching the live streamer account, so that the live stream prompt screen is displayed in a playback client logged in by using the user account, where the live stream prompt screen includes pause prompt information used for prompting that the live streamer account has currently paused the live stream.

In some embodiments, a person of ordinary skill in the art may understand that, the structure shown in FIG. 12 is only illustrative. The electronic device may be a terminal device such as a smartphone (for example, an Android phone or an iOS phone), a tablet computer, a palmtop computer, a mobile Internet device (MID), or a PAD. FIG. 12 does not limit the structure of the electronic device. For example, the electronic device may further include more or fewer components (such as a network interface) than those shown in FIG. 12, or may have a configuration different from that shown in FIG. 12.

The memory 1202 may be configured to store a software program and module, for example, a program instruction/module corresponding to the live stream screen display method and apparatus in the embodiments of this application, and the processor 1204 performs various functional applications and data processing by running the software program and module stored in the memory 1202, that is, implementing the foregoing live stream screen display method. The memory 1202 may include a high-speed random access memory, and may further include a non-volatile memory such as one or more magnetic storage apparatuses, a flash memory, or another non-volatile solid-state memory. In some examples, the memory 1202 may further include memories remotely disposed relative to the processor 1204, and these remote memories may be connected to a terminal through a network. The foregoing examples of the network include, but are not limited to, the Internet, an intranet, a local area network, a mobile communication network, and a combination thereof. The memory 1202 may be specifically configured to, but is not limited to, store information such as a live stream screen, a live stream prompt screen, and pause prompt information. In an example, as shown in FIG. 12, the memory 1202 may include, but is not limited to, the first recording unit 1102 and the generation unit 1104 in the foregoing live stream screen display apparatus. In addition, the memory may further include, but is not limited to, other modules and units in the foregoing live stream screen display apparatus, and details are not repeated in this example.

In some embodiments, a transmission apparatus 1206 is configured to receive or transmit data through a network. Specific examples of the network include a wired network and a wireless network. In an example, the transmission apparatus 1206 includes a network interface controller (NIC). The NIC may be connected to another network device and a router by using a network cable, so as to communicate with the Internet or a local area network. In an example, the transmission apparatus 1206 is a radio frequency (RF) module, and is configured to wirelessly communicate with the Internet.

In addition, the electronic device further includes: a display 1208, configured to display information such as the live stream screen, live stream prompt screen, and pause prompt information; and a connection bus 1210, configured to connect the module components in the electronic device.

In other embodiments, the terminal device or server may be a node in a distributed system. The distributed system may be a blockchain system. The blockchain system may be a distributed system formed by a plurality of nodes connected in the form of network communication. A peer to peer (P2P for short) network may be formed between the nodes. A computing device in any form, for example, an electronic device such as a server or a terminal, may become a node in the blockchain system by joining the P2P network.

According to an aspect of this application, a computer program product or a computer program is provided, the computer program product or the computer program including computer instructions, the computer instructions being stored in a computer-readable storage medium. A processor of the computer device reads the computer instructions from the computer-readable storage medium, and executes the computer instructions, to cause the computer device to perform the foregoing live stream screen display method, where the computer program is configured to, when run, perform the steps in any one of the foregoing method embodiments.

In some embodiments, the computer-readable storage medium may be configured to store a computer program configured to perform the following steps:

S1. Display a live stream screen currently to be shared by a live streamer account through a client of a live stream application in a display screen of a target mobile terminal, and perform screen recording on the live stream screen, where the live stream screen is a running screen of a target application, and the target application is an application authorized to perform screen recording during a live stream of the live streamer account.

S2. Generate a live stream prompt screen in the client of the live stream application in a process in which the running screen of the target application in the display screen is switched to be displayed as a running screen of a first application that does not belong to the target application, and push the live stream prompt screen to a user account watching the live streamer account, so that the live stream prompt screen is displayed in a playback client logged in by using the user account, where the live stream prompt screen includes pause prompt information used for prompting that the live streamer account has currently paused the live stream.

In some embodiments, a person of ordinary skill in the art may understand that all or some of the steps of the various methods in the foregoing embodiments may be implemented by a program instructing relevant hardware of a terminal device. The program may be stored in a computer-readable storage medium. The storage medium may include: a flash drive, a read-only memory (ROM), a random access memory (RAM), a magnetic disk, an optical disc, or the like.

The sequence numbers of the foregoing embodiments of this application are merely for description purpose, and do not indicate the preference among the embodiments.

When the integrated unit in the foregoing embodiments is implemented in the form of a software function unit and sold or used as an independent product, the integrated unit may be stored in the computer-readable storage medium. Based on such an understanding, the technical solutions of the present invention essentially, or a part contributing to the related art, or all or some of the technical solutions may be presented in a form of a software product. The computer software product is stored in a storage medium and includes several instructions for instructing one or more computer devices (which may be a personal computer, a server, a network device, or the like) to perform all or some of steps of the methods in the embodiments of the present invention.

In the foregoing embodiments of the present invention, the descriptions of the embodiments have respective focuses. For a part that is not described in detail in an embodiment, reference may be made to related descriptions in other embodiments.

In the several embodiments provided in this application, it is to be understood that the disclosed client may be implemented in other manners. The described apparatus embodiments are merely exemplary. For example, the unit division is merely logical function division, and other division manners may be used during actual implementation. For example, a plurality of units or components may be combined or integrated into another system, or some features may be omitted or not performed. In addition, the displayed or discussed mutual couplings or direct couplings or communication connections may be implemented through some interfaces. The indirect couplings or communication connections between the units or modules may be implemented in electronic or another form.

The units described as separate parts may or may not be physically separate. Parts displayed as units may or may not be physical units, and may be located in one position, or may be distributed on a plurality of network units. Some or all of the units may be selected according to an actual requirement to achieve the objectives of the solutions in the embodiments.

In addition, the functional units in the embodiments of the present invention may be integrated into one processing unit, or each of the units may exist alone physically, or two or more units are integrated into one unit. The integrated unit may be implemented in the form of hardware, or may be implemented in the form of a software function unit.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The foregoing descriptions are exemplary implementations of the present invention. A person of ordinary skill in the art may make some improvements and modifications without departing from the principle of the present invention and the improvements and modifications shall fall within the protection scope of the present invention.

What is claimed is:

1. A live stream screen display method, performed by an electronic device, the method comprising:
    obtaining a running screen of a target application displayed in a display screen of a target mobile terminal used by a live streamer account, and pushing the running screen to a user device corresponding to a user account watching the live streamer account as a live stream screen; and
    when the running screen of the target application in the display screen is affected by a running screen of a first application that does not belong to at least one preset target application, stopping pushing a current screen displayed in the display screen to the user device and pushing a live stream prompt screen to the user device, the live stream prompt screen indicating that the live streamer account has currently paused the live stream.

2. The method according to claim 1, further comprising:
    when the first application belongs to the at least one preset target application,
    continuing performing the operation of obtaining a running screen of a target application displayed in a display screen of a target mobile terminal used by a live streamer account.

3. The method according to claim 1, wherein the running screen of the target application in the display screen is affected by a running screen of a first application that does not belong to at least one preset target application when the running screen of the target application is replaced by the running screen of the first application in the display screen.

4. The method according to claim 1, wherein the pushing a live stream prompt screen to the user device comprises:

generating the live stream prompt screen whose content is determined by the first application; and pushing the live stream prompt screen to the user device to be displayed for a predetermined time period until after the target application is restored on the display screen of the target mobile terminal.

5. The method according to claim 4, wherein the predetermined time period terminates after a user of the target mobile terminal performs a predefined operation on the first application.

6. The method according to claim 1, wherein the target application is determined by:

displaying a first identifier set, wherein identifiers in the first identifier set are application identifiers of applications that are not authorized to perform screen recording during the live stream of the live streamer account; and in response to a first selection operation performed on a first identifier in the first identifier set, determining an application corresponding to the first identifier as the target application.

7. The method according to claim 1, further comprising:

determining a second application currently run in the display screen of the target mobile terminal in response to a live stream start request of the live streamer account triggered on the target mobile terminal;

when the second application does not belong to at least one preset target application, pushing the live stream prompt screen to the user device corresponding to the user account watching the live streamer account as a live stream screen; and when the second application belongs to at least one preset target application, obtaining a running screen of the second application displayed in the display screen of the target mobile terminal and pushing the running screen to the user device corresponding to the user account watching the live streamer account as a live stream screen.

8. An electronic device, comprising a memory and a processor, the memory storing a computer program that, when executed by the processor, causes the electronic device to perform a live stream screen display method including:

obtaining a running screen of a target application displayed in a display screen of a target mobile terminal used by a live streamer account, and pushing the running screen to a user device corresponding to a user account watching the live streamer account as a live stream screen; and when the running screen of the target application in the display screen is affected by a running screen of a first application that does not belong to at least one preset target application, stopping pushing a current screen displayed in the display screen to the user device and pushing a live stream prompt screen to the user device, the live stream prompt screen indicating that the live streamer account has currently paused the live stream.

9. The electronic device according to claim 8, wherein the method further comprises:

when the first application belongs to the at least one preset target application, continuing performing the operation of obtaining a running screen of a target application displayed in a display screen of a target mobile terminal used by a live streamer account.

10. The electronic device according to claim 8, wherein the running screen of the target application in the display screen is affected by a running of a first application that does not belong to at least one preset target application when the running screen of the target application is replaced by the running screen of the first application in the display screen.

11. The electronic device according to claim 8, wherein the pushing a live stream prompt screen to the user device comprises:

generating the live stream prompt screen whose content is determined by the first application; and pushing the live stream prompt screen to the user device to be displayed for a predetermined time period until after the target application is restored on the display screen of the target mobile terminal.

12. The electronic device according to claim 11, wherein the predetermined time period terminates after a user of the target mobile terminal performs a predefined operation on the first application.

13. The electronic device according to claim 8, wherein the target application is determined by:

displaying a first identifier set, wherein identifiers in the first identifier set are application identifiers of applications that are not authorized to perform screen recording during the live stream of the live streamer account; and in response to a first selection operation performed on a first identifier in the first identifier set, determining an application corresponding to the first identifier as the target application.

14. The electronic device according to claim 8, wherein the method further comprises:

determining a second application currently run in the display screen of the target mobile terminal in response to a live stream start request of the live streamer account triggered on the target mobile terminal;

when the second application does not belong to at least one preset target application, pushing the live stream prompt screen to the user device corresponding to the user account watching the live streamer account as a live stream screen; and when the second application belongs to at least one preset target application, obtaining a running screen of the second application displayed in the display screen of the target mobile terminal and pushing the running screen to the user device corresponding to the user account watching the live streamer account as a live stream screen.

15. A non-transitory computer-readable storage medium, storing a computer program that, when executed by a processor of an electronic device, causes the electronic device to perform a live stream screen display method including:

obtaining a running screen of a target application displayed in a display screen of a target mobile terminal used by a live streamer account, and pushing the running screen to a user device corresponding to a user account watching the live streamer account as a live stream screen; and when the running screen of the target application in the display screen is affected by a running screen of a first application that does not belong to at least one preset target application, stopping pushing a current screen displayed in the display screen to the user device and pushing a live stream prompt screen to the user device, the live stream prompt screen indicating that the live streamer account has currently paused the live stream.

16. The non-transitory computer-readable storage medium according to claim 15, wherein the running screen of the target application in the display screen is affected by a running screen of a first application that does not belong to at least one preset target application when the running screen of the target application is replaced by the running screen of the first application in the display screen.

17. The non-transitory computer-readable storage medium according to claim 15, wherein the pushing a live stream prompt screen to the user device comprises:
   generating the live stream prompt screen whose content is determined by the first application; and
   pushing the live stream prompt screen to the user device to be displayed for a predetermined time period until after the target application is restored on the display screen of the target mobile terminal.

18. The non-transitory computer-readable storage medium according to claim 17, wherein the predetermined time period terminates after a user of the target mobile terminal performs a predefined operation on the first application.

19. The non-transitory computer-readable storage medium according to claim 15, wherein the target application is determined by:
   displaying a first identifier set, wherein identifiers in the first identifier set are application identifiers of applications that are not authorized to perform screen recording during the live stream of the live streamer account; and
   in response to a first selection operation performed on a first identifier in the first identifier set, determining an application corresponding to the first identifier as the target application.

20. The non-transitory computer-readable storage medium according to claim 15, wherein the method further comprises:
   determining a second application currently run in the display screen of the target mobile terminal in response to a live stream start request of the live streamer account triggered on the target mobile terminal;
   when the second application does not belong to at least one preset target application, pushing the live stream prompt screen to the user device corresponding to the user account watching the live streamer account as a live stream screen; and
   when the second application belongs to at least one preset target application, obtaining a running screen of the second application displayed in the display screen of the target mobile terminal and pushing the running screen to the user device corresponding to the user account watching the live streamer account as a live stream screen.

* * * * *